Figure 1:
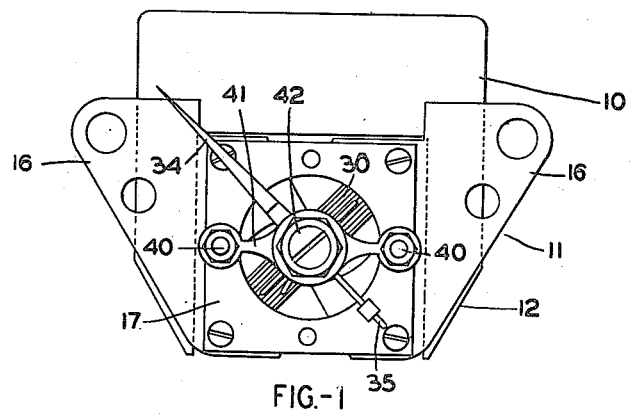

April 18, 1944.           R. D. HICKOK           2,346,683
                           RATIO METER
                       Filed May 9, 1942           2 Sheets-Sheet 1

INVENTOR
ROBERT D. HICKOK
BY
Hyde and Meyer
ATTORNEYS

April 18, 1944.  R. D. HICKOK  2,346,683
RATIO METER
Filed May 9, 1942  2 Sheets-Sheet 2

INVENTOR
ROBERT D. HICKOK
BY
Hyde and Meyer
ATTORNEYS

Patented Apr. 18, 1944

2,346,683

UNITED STATES PATENT OFFICE 2,346,683

RATIO METER

Robert D. Hickok, Bratenahl, Ohio, assignor to Cleveland Patents, Incorporated, Cleveland, Ohio, a corporation of Ohio Application May 9, 1942, Serial No. 442,322

6 Claims. (Cl. 171—95)

This invention relates to electrical meters, and more particularly to those known as "ratio" or "quotient" meters. Such meters are so called because, although fundamentally ammeters, they are provided with electrical control by which an electromagnetically developed torque is used to oppose the torque developed by the main element, in such manner that deflection of the pointer for any given conditions is proportional to the ratio of voltage to current, i. e., resistance, instead of being directly proportional to voltage.

The ratio meter of the present invention is of the moving-coil type, utilizing two moving coils mounted to turn in an electromagnetic field to a stable position depending upon the particular value of an unknown resistance suitably included in the meter circuit, with the possibility of graduating the scale either directly in units of resistance, as ohms, or in units of some other function which may vary in step with variations in resistance, such as units of temperature, as when the instrument is used to measure temperature by the employment of a resistance element whose resistance varies with variations in temperature.

One object of the invention is to simplify and improve the meter movement by locating most of the moving parts, including the coils, in the space between the magnet poles, thereby subjecting them to the effect of a magnetic field of maximum strength by resort to the use of platelike pole pieces external to and presented flatwise to elongated coils, together with core pieces within said space and about which the coils turn, as the result of which the meter movement, as a whole, is quite compact and may be considerably reduced in over-all thickness, and is extremely sensitive, as compared with prior movements for the same purpose.

A further object of the invention is to provide a meter of this kind in which two poles of the same magnet are associated with each of the two moving coils, but with a separate electromagnetic field or a separate portion of the same electromagnetic field, assigned to or effectively associated with each of the two coils, and more particularly, with only the outwardly presented portions of the two coils, to the end of securing maximum field density and relatively high efficiency and sensitivity, all independent of variations in the strength of the magnet.

A further object of the invention is to provide a meter of the class described, including two moving coils generally alike in form and located in superposed and symmetrical relation to each other, together with a plate-like core for each coil electrically insulated from other parts, and pole pieces or extensions also of plate form and parallel to each other and to the core plates, whereby two electromagnetic fields or field zones are supplied, one for the outermost portion of each coil, with a neutral zone between the coils and core plates, and enabling either or both of the two fields to be formed or graded as desired by appropriate shaping of the overlying portions of the corresponding pole and core plates, such as an arrangement enabling the meter to be designed to meet any required conditions or to produce any desired results.

A further object of the invention is to provide an improved ratio meter including outer parallel pole plates and inner parallel core plates between them, with two moving coils mounted to envelop and turn about the core plates, together with a magnet having poles associated therewith, so as to provide two like but oppositely dispersed magnetic fields or field zones, one for each coil, all, or substantially all, thereof being contained in the space between the magnet poles, so that the instrument is compact and of minimum over-all thickness.

A further object of the invention is to provide a ratio meter including two moving coils and the necessary magnet poles or pole pieces therefor, together with an electromagnetic bridge in shunt across the magnet poles in such manner as to directly affect the magnetic field for but one of said coils, said bridge being made of material whose magnetic permeability varies with variations in temperature, thus introducing into the meter appropriate temperature compensation which, in the particular arrangement shown, is sufficient to take account of the effect of temperature variations in the entire instrument, as is necessary and desirable in this class of instrument.

Further objects of the invention are in part obvious and in part will appear more in detail hereinafter.

Figure 2:
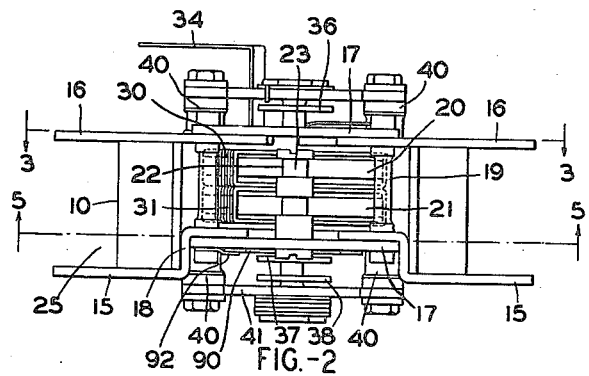
Figure 3:
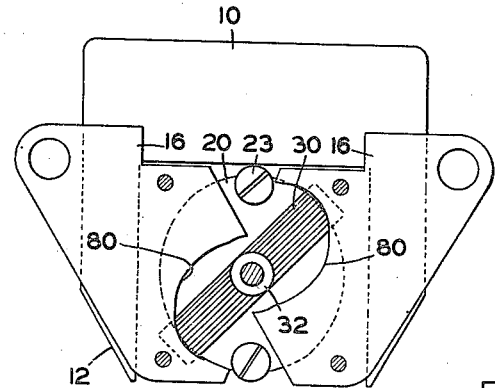
Figures 4, 4A:
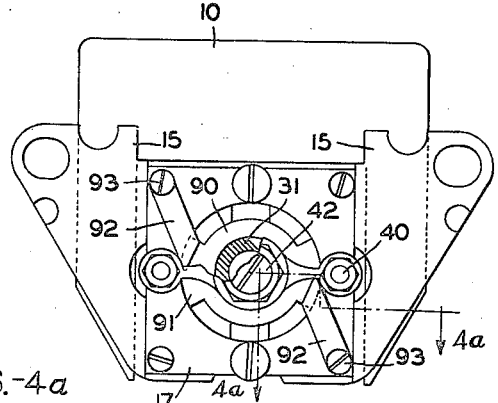
Figure 5:
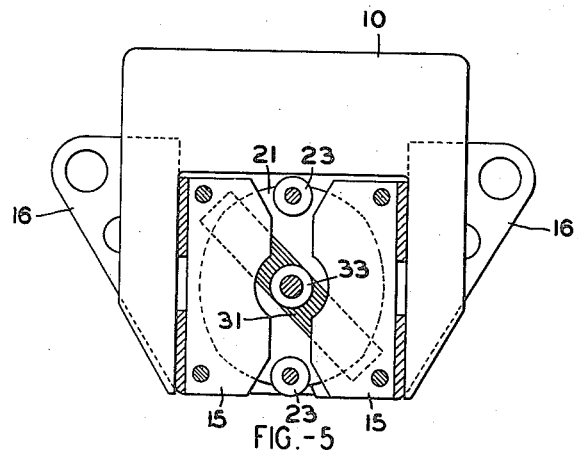
Figure 6:
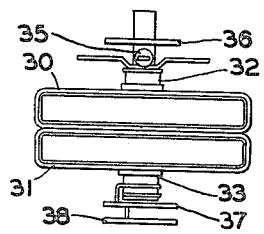
Figure 7:
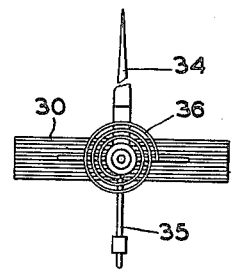
Figure 8:
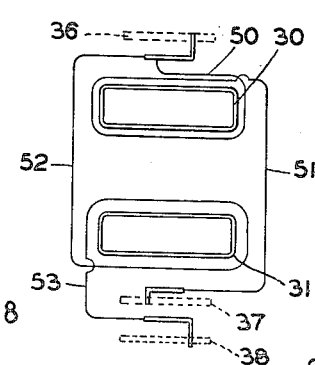
Figure 9:
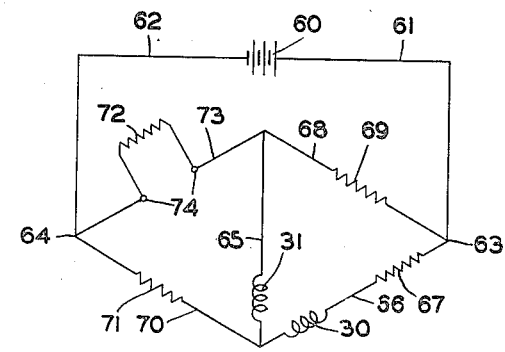
Figure 10:
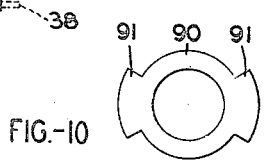

In the drawings, which represent one suitable embodiment of the invention, Fig. 1 represents a top plan view of the movement; Fig. 2 is an elevation thereof, as viewed from below in Fig. 1; Fig. 3 is a sectional plan view on the line 3—3, Fig. 2, looking in the direction of the arrows; Fig. 4 is a bottom plan view of the movement; Fig. 4a is a detail sectional view on the line 4a—4a, Fig. 4, looking in the direction of the arrows; Fig. 5 is a sectional plan view, from below, on the line 5—5, Fig. 2, looking in the direction of the arrows; Fig. 6 is a detail elevation of the rotating member; Fig. 7 is a plan view thereof; Fig. 8 is a diagram conventionally illustrating the electrical connections to the moving coils; Fig. 9 is a diagram of the electrical circuits of the complete instrument; and Fig. 10 is a detail view of a temperature compensating bridge.

Generally speaking, the particular form of instrument chosen for illustration in the drawings is similar to that of my prior patent for Electrical meter, No. 2,245,781, granted June 17, 1941, to which reference may be had if desirable or necessary. Here, as in the prior meter, the mechanism consists of two units, to-wit, a U-form permanent magnet unit 10 and a movement unit 11 assembled by relative sliding motion to introduce the magnet poles into the cavities of the movement unit, the two units when assembled being held together both frictionally and by electromagnetic attraction. The poles of the permanent magnet are straight and of rectangular cross section, but are cut off diagonally along their outer faces toward their ends, as at 12, to more readily accommodate the final assembly to an enclosing casing (not shown), as is usual.

The movement unit, as in the prior construction, is symmetrical about a plane parallel to and between the magnet poles, so that a number of the parts of the movement unit are respectively rights and lefts, as will be readily understood without further reference thereto in the detailed description. Said unit includes certain stationary parts which are assembled and secured together as a stationary rigid frame member, and other movable parts assembled to turn as a rotating member in said frame. The stationary member includes two pairs of pole plates or pieces, to-wit, two bottom pole plates 15 and two top pole plates 16, all made of magnetic material, such as steel, the two plates of each pair being cross connected by a rectangular open center bridge plate 17 made of nonmagnetic material, such as brass. Top pole plates 16 are flat sheets with all the metal thereof in the same plane, while the bottom pole plates 15 are offset intermediate their inner and outer edges, as at 18. The two pairs of pole plates, connected by their respective bridges, are held rigidly in spaced parallel relation by screw posts and spacing members 19, also made of nonmagnetic material. The bridge plate 17 connecting the bottom pole plates also serves as a support for two core plates, to-wit, an upper core plate 20 and a lower core plate 21. These core plates are of sheet metal, somewhat thicker than the metal of the pole plates. In plan view they are of the same shape, to-wit, generally but not exactly circular, each being provided with two oppositely spaced open edge recesses 22 to receive reduced portions of pillars 23 attached to the bottom bridge plate 17, on which they are thereby mounted in parallel relation to each other and between the likewise parallel top and bottom pole plates.

Thus, the upper and lower pairs of pole plates, each pair of connected by its bridge 17, together with the pillars 19 connecting them and the posts 23 supporting the two core plates, when all are assembled, constitute a firm, strong, rigid frame member presenting outwardly two open recesses 25 into which the poles of the permanent magnet are introduced, and which frame also supports the remaining movable member of the meter, as will now appear.

This ratio meter includes two moving coils, to-wit, an upper coil 30, which actually is the voltage coil, and a lower high resistance coil 31, which is the current coil. As shown in Figs. 6 and 7, the two coils are alike, each being relatively long, narrow and thin, the two coils being connected in superposed or piled relation and symmetrically disposed with reference to each other and to the axis about which they turn. As is usual they may be made of fine enameled wire wound about a suitable light thin form, such as an aluminum shell, to give them strength and body. In the final assembly the two coils are secured to each other back to back or bottom to top, as it were, as shown in Fig. 6, with the openings through the two coils presented horizontally in the same direction. Mounted on the top of the upper coil and upon the bottom of the lower coil are two blocks 32, 33, which support the jewels or pivots for the rotating member, as is usual. The upper block 32 also carries the needle or pointer 34, any necessary poise arms 35, and a single hair spring marked generally 36, while the lower block carries two hair springs 37, 38. These hair springs are of ordinary form and constitute the leads from the stationary member of the movement to the moving coils, and description of their details and how they and the coils are insulated from each other and from other parts are unnecessary.

When building the meter, after separate fabrication of the two coils and assembly of each with its shell, the two blocks 32, 33 are applied to the coils and the two coils are applied to each other, with cement, the assembly being baked and dried to form a rigid symmetrical member, as will be readily understood.

To rotatably mount the moving member in the rigid frame member before referred to, each of the nonmagnetic bridge plates 17 is provided with two posts 40 supporting a cross bar 41 carrying the usual jewel mount 42 to receive the jewel upon one of the jewel carrying blocks 32, 33 of the rotating member.

When all parts of the meter movement are assembled, as shown in Figs. 1 and 2, the pole plates 15, 16 are in contact flatwise with the permanent magnet poles and form extensions thereof and therefore determine distribution of the lines of force of the magnetic field. The field form and density are also affected by the core plates 20, 21 which lie between the pole plates, in planes parallel thereto and to each other, each of said core plates being embraced or contained within one of the moving coils. In other words, the core plates and coils are symmetrically disposed about the axis of rotation, so that the coils turn around but always contain or embrace the core plates, with the wires of the coils moving in the very narrow air gaps between the flat surfaces of the core plates and pole plates presented flatwise to each other. Those portions of the two coils which are cemented together and which move in the space between the two core plates are in a portion of the electromagnetic field which may be regarded as neutral or of no effect or moment, the most effective portions of the magnetic field being those in the gaps between the outer flat face of the two core plates and the flat surfaces of the pole pieces opposite to them. Of course, there is some field flux between the edge of each core plate and the nearest magnet pole, and a short end portion of each coil moves in that gap, but the gap widens toward each end of the coil swing and for the purpose of this description such field flux may be disregarded as of small effect.

Fig. 8 is a conventional diagram illustrating the wiring connections to the two coils in the particular instrument here illustrated. 36, 37 and 38 conventionally illustrate the single upper and two lower hair springs before referred to. As will be observed, within the rotating member itself the upper single hair spring 36 is connected by a lead wire 50 to and through the upper coil 30 and thence by wire 51 to the lower hair spring 37, while the same upper hair spring 36 is connected by a lead wire 52 to and through the lower coil 31 and by a lead wire 53 to the lower hair spring 38. The two coils, it will be observed, are wound in opposite directions, with opposing or bucking effects, and the connections described connect the two coils in shunt or parallel, as it were.

However, the invention is not limited to the particular manner of connection of the coils described, or even to any particular circuit arrangement, since two moving coils forming part of the same rotating member in a meter of this kind may be connected or associated with each other or other parts in various ways and for different purposes, as will be readily understood.

Fig. 9 illustrates a diagram of one circuit arrangement for a meter of this kind, and more particularly for a ratio meter intended to measure resistance, but provided with a scale calibrated to indicate degrees of temperature because the unknown resistance, to which the meter is intended to be connected, is a resistance element whose resistance is variable proportionately to variations in temperature thereof. Such uses of instruments of this kind are well known.

In Fig. 9, as will be observed, the circuit arrangement is that of the Wheatstone bridge. 60 represents a suitable source of current to which the instrument is connected, such as a battery, generator or the like. Leads 61, 62 therefrom are connected to the points 63, 64 at opposite ends of the Wheatstone bridge, the cross bridge wire 65 of which includes the bottom moving coil 31, which is of relatively high resistance. One of the legs 66 of the Wheatstone bridge includes the top moving coil 30, which is of relatively low resistance, and also a fixed resistance 67 of any suitable value, say, approximately 1400 ohms. The opposite leg 68 of the bridge includes a known resistance 69 of any suitable definite value, say, 2000 ohms. Leg 70 of the bridge includes a resistance 71 of known value selected according to the approximate value of the unknown resistance to be measured, as well as the desired range of variation in resistance. In this instance we may assume resistance 71 to have a value of approximately 40 ohms. 72 indicates the unknown resistance to be measured, which is inserted into leg 73 of the circuit by suitable leads to the binding posts 74.

With such an arrangement as that described it is at once apparent that when the system is in operation the rotating element is subjected chiefly to two opposing torques developed by the oppositely wound coils, although subject as well to the torques of the several hair springs, which theoretically could or should be zero, but which springs practically are made with torque as small as possible and so low, as compared to the torque of the moving coils, as to be negligible.

Because of the particular locations of the two moving coils in the circuit, and the facts that they are wound in bucking relation and that the low torque of the hair springs may be disregarded, the instrument is substantially independent of reasonable variations in voltage of the source, as is usual in ratio meters. Those portions of both coils which move in effective portions of the magnetic field, to-wit, the turns of wire in the upper half of voltage coil 30 and in the lower half of current coil 31, travel in very narrow air gaps providing maximum sensitivity. That is especially desirable as to the current coil 31, the field for which is produced between the bottom core plate 21 and those portions of the bottom pole plates 15 presented flatwise thereto and which are here shaped to produce substantially uniform field density throughout the range of coil movement. The voltage coil 30, however, while it also moves in a corresponding narrow air gap, is provided with a magnetic field specially formed or graded to produce stability of the rotating member at all points in the range of movement. This is accomplished by appropriate forming or shaping of either or both of the core plate and pole plate for this coil. In the arrangement shown, the pole plates 16 alone are specially shaped, their inwardly projecting portions which lie opposite to or are presented flatwise to the corresponding core plate 20 being cut away along the inner edge 80 on an eccentric curve, so that a weak field is effective upon the coil 30 when it lies at the low value end of the scale and a strong or dense field when it lies at the opposite end, with the field strength varying progressively from end to end of the range of coil movement according to the particular curvature or shape chosen for the edge 80. This makes it possible to design the instrument with a logarithmic, uniform, or other form of scale which provides the most accurate or desired readings.

Because of the respective locations of the two moving coils in the particular Wheatstone bridge circuit shown, and because they are wound oppositely, they tend to be cross compensating for variations in temperature of the instrument as a whole. In other words, the effect of a rise in temperature of one of the moving coils tends to compensate for the effect of a rise in temperature of the other moving coil. But, in practice, it is impossible to include sufficient ohms of resistance in the voltage coil 30 to fully cross compensate for the effect of variation in temperature in the current coil 31. Full compensating effect might be secured by including in the leg 66 of the Wheatstone bridge which includes coil 30, but external to said coil, another resistance coil (not shown) made of suitable metal to provide the necessary additional cross compensating effect for coil 31. But use of such an extra compensating coil is not always desirable or satisfactory. In the present instrument full temperature compensating effect is secured by the use of a magnetic bridge 90, made of suitable NiFe or NiCuFe alloy whose magnetic permeability varies inversely with variation in its temperature. That is, as its temperature is increased, its magnetic permeability decreases.

Bridge 90 has an inner annular portion of washer shape provided with two outwardly extending ears 91, whose outer edges are formed on the arc of a circle having the same diameter as that of the round hole in the bridge plate 17 (see Fig. 4), but the sheet metal of which bridge 90 is formed is slightly thicker than that of plate 17, as shown in Fig. 4a. Thus, bridge 90 may be inserted flatwise into the round opening of plate 17 until its ears 91 reach full contact with the faces of pole pieces 15. Bridge 90 then extends outwardly slightly beyond the surface of bridge plate 17, but it also extends across the gap between the bottom pole plates 15, with its ears 91 held flatwise against the lower faces thereof by short resilient leaf springs 92 fastened to the bottom bridge plate 17 by screws 93.

Magnetic bridge 90, inserted into the instrument as shown, provides the necessary compensating effect for the uncompensated portion of the effect of current coil 31. In other words, in this instrument, including bridge 90, so far as variations in temperature of the instrument are concerned, the tendency or effect of the voltage coil 30 plus the tendency or effect of the magnetic bridge 90, to raise the meter reading as the result of a variation in temperature of the instrument, may be made to exactly balance the opposite tendency or effect of the current coil 31 to lower the meter reading, as the result of the same temperature variation.

Thus, while the bridge 90 is in the field only for the current coil 31, its effect when added to the cross effects of the moving coils upon each other, is sufficient to take care of any error in meter reading due to temperature variation of the instrument as a whole. Full temperature compensation is therefore secured by a simple and yet fully effective expedient.

Considering the completely assembled movement, operated in a suitable circuit such as in the manner described, it will at once be apparent that notwithstanding the fact that the movement includes two moving coils it nevertheless has been compacted or compressed into a volume not much greater, if any, than that of a single coil instrument. A single permanent magnet is employed and in the space between its poles are located all of the magnetically effective parts of the system. In other words, in that space are two complete electromagnetic fields, a core for each thereof, and a moving coil. The neutral space between the two core plates is of minimum thickness and the air gaps where the coil wires move through the field flux are narrow so that the flux is dense or concentrated with maximum torque effect. Nevertheless the instrument lends itself to forming or grading of the core or pole plates such as will produce the most desirable or efficient scale, in addition to which the movement includes automatic temperature compensation. It is extremely accurate, can be made and assembled at relatively low cost, is quite durable and is not likely to get out of order in service.

Other advantages of the invention will be apparent to those skilled in the art.

What I claim is:

1. Meter mechanism of the character described, comprising a permanent magnet having parallel opposed pole arms, pole plates engaging the surfaces of said arms and extending inwardly in parallel planes, two core plates mounted in parallel relation in spaced planes parallel to and between the pole plates, two movable coils respectively mounted to move about the two core plates and rotatable as a unit, the two coils being of like, elongated, thin, narrow form, and the contiguous portions of the two coils being secured together in superposed relation and turning in a narrow air gap having negligible flux.

2. Meter mechanism of the character described, comprising a permanent magnet having parallel opposed pole arms, pole plates engaging the surfaces of said arms and extending inwardly in parallel planes, two core plates mounted in parallel relation in spaced planes parallel to and between the pole plates, and two movable coils respectively mounted to move about the two core plates and rotatable as a unit, two of said pole plates which are mounted on corresponding faces of their respective pole arms being shaped to circumferentially modify the flux through that portion of the magnetic field extending through such pole plates and the neighboring core plate.

3. Meter mechanism of the character described, comprising a permanent magnet having parallel opposed pole arms, pole plates engaging the surfaces of said arms and extending inwardly in parallel planes, two core plates mounted in parallel relation in spaced planes parallel to and between the pole plates, two movable coils respectively mounted to move about the two core plates and rotatable as a unit, the two coils being of like elongated form, one long side of each coil turning in a narrow air gap having its own field flux distinct from that of the other coil, and a magnetic bridge in shunt across one of said air gaps and formed of material whose magnetic permeability varies with variations in temperature, thereby automatically to compensate for such variations.

4. A ratio meter, comprising a permanent magnet having parallel opposed pole arms, pole plates engaging the surfaces of said arms and extending inwardly in parallel planes, two core plates spaced apart and lying parallel to and between the planes of said pole plates, a voltage coil rotatable about one of said core plates, and a current coil rotatable about the other core plate, and a magnetic bridge in shunt across the air gap for the current coil and formed of material whose magnetic permeability varies with variations in temperature, thereby automatically to compensate for such variations.

5. A ratio meter, comprising a permanent magnet having parallel opposed pole arms, pole plates engaging the surfaces of said arms and extending inwardly in parallel planes, two core plates spaced apart and lying parallel to and between the planes of said pole plates, a voltage coil rotatable about one of said core plates, and a current coil rotatable about the other core plate, and a magnetic bridge in shunt across the air gap for the current coil and formed of material whose magnetic permeability varies with variations in temperature, thereby automatically to compensate for such variations, said bridge being of washer form and held firmly against the flat surfaces of the pole plates of the field whose flux it modifies.

6. Meter mechanism of the character described comprising a permanent magnet having opposed pole arms, a pair of pole plates engaging, respectively each of two opposed sides of said pole arms and extending inwardly therefrom to partially enclose, between said pairs of pole plates and said arms, a field of concentrated magnetic force, one pair only of said pole plates having inwardly offset inner portions extending within the space defined between said pole arms, two core plates mounted in parallel relation in spaced planes parallel to and between the pole plates, two movable coils respectively mounted to move about the two core plates and rotatable as a unit, the two coils being of like, elongated, thin, narrow form, and the contiguous portions of the two coils being secured together in superposed relation and turning in a narrow air gap having negligible flux.

ROBERT D. HICKOK.